(12) United States Patent
Kobayashi et al.

(10) Patent No.: US 9,893,982 B2
(45) Date of Patent: Feb. 13, 2018

(54) ROUTING CONTROL APPARATUS AND ROUTING CONTROL METHOD

(71) Applicant: Panasonic Intellectual Property Corporation of America, Torrance, CA (US)

(72) Inventors: Hirokazu Kobayashi, Tokyo (JP); Ryohei Kimura, Osaka (JP); Hiroyuki Sasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 253 days.

(21) Appl. No.: 14/427,095

(22) PCT Filed: Jun. 17, 2014

(86) PCT No.: PCT/JP2014/003226
§ 371 (c)(1),
(2) Date: Mar. 10, 2015

(87) PCT Pub. No.: WO2014/208045
PCT Pub. Date: Dec. 31, 2014

(65) Prior Publication Data
US 2015/0236947 A1    Aug. 20, 2015

(30) Foreign Application Priority Data

Jun. 26, 2013   (JP) .................................. 2013-133304

(51) Int. Cl.
*H04L 12/733*    (2013.01)
*H04W 84/18*    (2009.01)
(Continued)

(52) U.S. Cl.
CPC .............. *H04L 45/20* (2013.01); *H04L 45/02* (2013.01); *H04L 47/17* (2013.01); *H04W 84/18* (2013.01)

(58) Field of Classification Search
None
See application file for complete search history.

(56) References Cited

U.S. PATENT DOCUMENTS 6,377,551 B1 *    4/2002    Luo .......................... H04L 45/12
                                                            370/238
7,852,764 B2    12/2010    Yamaguchi et al.
(Continued)

FOREIGN PATENT DOCUMENTS

| JP | 2006-246202 | 9/2006 |
| JP | 2009-273140 | 11/2009 |

(Continued)

OTHER PUBLICATIONS

International Search Report dated Sep. 16, 2014 in corresponding International Application No. PCT/JP2014/003226.
(Continued)

*Primary Examiner* — Ayaz Sheikh
*Assistant Examiner* — Tarell Hampton
(74) *Attorney, Agent, or Firm* — Wenderoth, Lind & Ponack, L.L.P.

(57) ABSTRACT

A routing control apparatus that constructs a transmission path for transmitting communication data in a wireless mesh network includes: a previous hop state managing unit that receives a first control signal for constructing a portion of the transmission path, and manages first information indicating operability, which is availability of a previous hop apparatus in a future, the portion being from a source apparatus to the routing control apparatus; an operation state managing unit that manages second information indicating operability of (Continued)

the routing control apparatus; and a routing control processing unit that compares the first information and the second information, and, if the operability of the routing control apparatus is higher than or equal to the operability of the previous hop apparatus, transmits a second control signal for constructing a remaining portion of the transmission path other than the portion.

10 Claims, 8 Drawing Sheets

(51) Int. Cl.
*H04L 12/801* (2013.01)
*H04L 12/751* (2013.01)

(56) References Cited

U.S. PATENT DOCUMENTS

| | | | | |
|---|---|---|---|---|
| 8,149,715 | B1* | 4/2012 | Goel | H04L 45/123 370/238 |
| 2006/0199530 | A1* | 9/2006 | Kawasaki | H04B 7/2606 455/7 |
| 2006/0268749 | A1* | 11/2006 | Rahman | H04L 45/02 370/256 |
| 2006/0268879 | A1* | 11/2006 | Xhafa | H04L 45/123 370/392 |
| 2006/0293061 | A1* | 12/2006 | Kobayashi | H04L 45/02 455/455 |
| 2007/0248065 | A1* | 10/2007 | Banerjea | H04L 45/26 370/338 |
| 2008/0075028 | A1* | 3/2008 | Park | H04L 45/122 370/311 |
| 2009/0168653 | A1* | 7/2009 | St. Pierre | H04L 45/00 370/238 |
| 2009/0201844 | A1* | 8/2009 | Bhatti | H04L 12/185 370/312 |
| 2010/0135176 | A1* | 6/2010 | Kazmi | H04W 24/08 370/252 |
| 2010/0165846 | A1 | 7/2010 | Yamaguchi et al. | |
| 2010/0323683 | A1* | 12/2010 | Kazmi | H04W 64/00 455/422.1 |
| 2011/0002226 | A1* | 1/2011 | Bhatti | H04W 40/24 370/248 |
| 2012/0134298 | A1 | 5/2012 | Liu | |

FOREIGN PATENT DOCUMENTS

| | | |
|---|---|---|
| JP | 2009273140 A * | 11/2009 |
| JP | 2011-205445 | 10/2011 |
| JP | 2011205445 A * | 10/2011 |
| JP | 2013-501438 | 1/2013 |
| WO | 2008/035600 | 3/2008 |
| WO | 2011/015153 | 2/2011 |

OTHER PUBLICATIONS

Charles E. Perkins, "Ad-hoc on-Demand Distance Vector Routing", Proceedings of the 2$^{nd}$ IEEE Workshop on Mobile Computing Systems and Applications, pp. 90-100, Feb. 1999.
T. Winter (Ed.) et al., "RPL: IPv6 Routing Protocol for Low-Power and Lossy Networks", Internet Engineering Task Force (IETF) RFC6550, Mar. 2012.
JP. Vasseur (Ed.) et al., "Routing Metrics Used for Path Calculation in Low-Power and Lossy Networks", Internet Engineering Task Force (IETF) RFC6551, Mar. 2012.
English translation of "920MHz-Band Telemeter, Telecontrol and Data Transmission Radio Equipment", ARIB STD-T108 Version 1.0, Association of Radio Industries and Businesses, Feb. 14, 2012.
IEEE Std 802.15.4e™-2012, "Part 15.4: Low-Rate Wireless Personal Area Networks (LR-WPANs), Amendment 1: MAC sublayer", Apr. 2012.

* cited by examiner

FIG. 12

| Apparatus identifier | IP1 | IP2 |
|---|---|---|
| Remaining battery amount | 55 % | 68 % |
| Estimated operation time | 25h16m44s | 27h52m18s |
| Sleep cycle | 50 ms | 10 ms |
| Time until next awake | 2 ms | 4 ms |
| Average operation time in one awake mode | 1000 μs | 350 μs |
| Total transmission time in immediately previous hour | 121.550 sec | 80.000 sec |
| Transmission time limit per hour | 360 sec | 360 sec |
| Maximum transmissible time | 238.450 sec | 240.000 sec |
| Update time | Time1 | Time2 |

ROUTING CONTROL APPARATUS AND ROUTING CONTROL METHOD

TECHNICAL FIELD

The present invention relates to a routing control apparatus and a routing control method.

BACKGROUND ART

Examples of a routing control method in a wireless mesh network include the Ad hoc On Demand Distance Vector (hereinafter referred to as "AODV") routing and the routing protocol for low power and lossy networks (RPL) (see Non Patent Literature (NPL) 1, NPL 2, and NPL 3, for example).

Examples of a standard specification of a physical layer and a media access control (MAC) layer in communication apparatuses constituting the wireless mesh network include the Institute of Electrical and Electronics Engineers (IEEE) 802.15.4 and IEEE 802.15.4e (see NPL 5, for example).

On the other hand, the Association of Radio Industries and Businesses has defined standard specifications of radio equipment utilizing radio waves (see NPL 4, for example).

Patent Literature (PTL) 1 discloses a technique concerning transferring of a route request in a wireless mesh network. More specifically, when an intermediate router in a transmission path in the wireless mesh network receives a route request, a link cost of the transmission path between a source apparatus and the router is added to a metric of the route request, thereby updating the metric. Then, when the updated metric is smaller than a metric in a routing table held by the intermediate router, routing information to the source apparatus in the routing table is updated.

CITATION LIST

Patent Literature

[PTL 1] Japanese Unexamined Patent Application Publication No. 2009-273140

Non Patent Literature

[NPL 1] C. Perkins and E. Royer. "Ad Hoc On-Demand Distance-Vector Routing". Proceedings of the 2nd IEEE Workshop on Mobile Computing Systems and Applications, pages 90-100, February 1999.
[NPL 2] T. Winter (Ed.), P. Thubert (Ed.), and the ROLL Team. RPL: IPv6 Routing Protocol for Low power and Lossy Networks. Internet Engineering Task Force (IETF) RFC6550, March 2012
[NPL 3] JP. Vasseur (Ed.), M. Kim (Ed.), and the ROLL Team. Routing Metrics Used for Path Calculation in Low-power and Lossy Networks, Internet Engineering Task Force (IETF) RFC6551, March 2012
[NPL 4] 920 MHz-Band Telemeter, Telecontrol and Data Transmission Radio Equipment, ARIB Standard, version 1.0 of ARIB STD-108, the Association of Radio Industries and Businesses
[NPL 5] IEEE Std 802.15.4e-2012. Part 15.4: Low-Rate Wireless Personal Area Networks (LR-WPANs) Amandent 1: MAC sublayer, April 2012 (P51-P57)

SUMMARY OF INVENTION

Technical Problem

However, according to the above-described technique, the path could be disconnected due to an operation condition of the router after plural hops from the source apparatus. In such a case, since the router has to deliver a signal for repairing the path to the source apparatus via the plural hops, there is a problem of increased costs at the time of a path loss.

Accordingly, one non-limiting and exemplary embodiment of the present invention provides a routing control apparatus, etc., that construct a stable transmission path with a reduced control communication amount in a wireless mesh network,

Solution to Problem

A routing control apparatus according to one aspect of the present invention is a routing control apparatus that constructs a transmission path for transmitting communication data from a source apparatus to a destination apparatus in a wireless mesh network. The routing control apparatus includes: a previous hop managing unit configured to receive a first control signal for constructing a portion of the transmission path, and manage first information indicating operability, which is availability of a previous hop apparatus in a future, the portion being from the source apparatus to the routing control apparatus, and the previous hop apparatus being a source of the first control signal that has been received; an operation managing unit configured to manage second information indicating operability of the routing control apparatus; and a routing control unit configured to compare the first information and the second information, and, if the operability of the routing control apparatus is higher than or equal to the operability of the previous hop apparatus, transmit a second control signal for constructing a remaining portion of the transmission path other than the portion.

It should be noted that these general or specific aspects may be implemented by a system, a method, an integrated circuit, a computer program or a computer-readable recording medium such as a CD-ROM, or by any combination of a system, a method, an integrated circuit, a computer program and a recording medium.

Advantageous Effects of Invention

The routing control apparatus according to the present invention can construct a stable transmission path with a reduced control communication amount in a wireless mesh network.

BRIEF DESCRIPTION OF DRAWINGS

FIG. 12 illustrates an example of information to be managed by a previous hop state managing unit in a routing control apparatus in an embodiment.

Figure 1A:
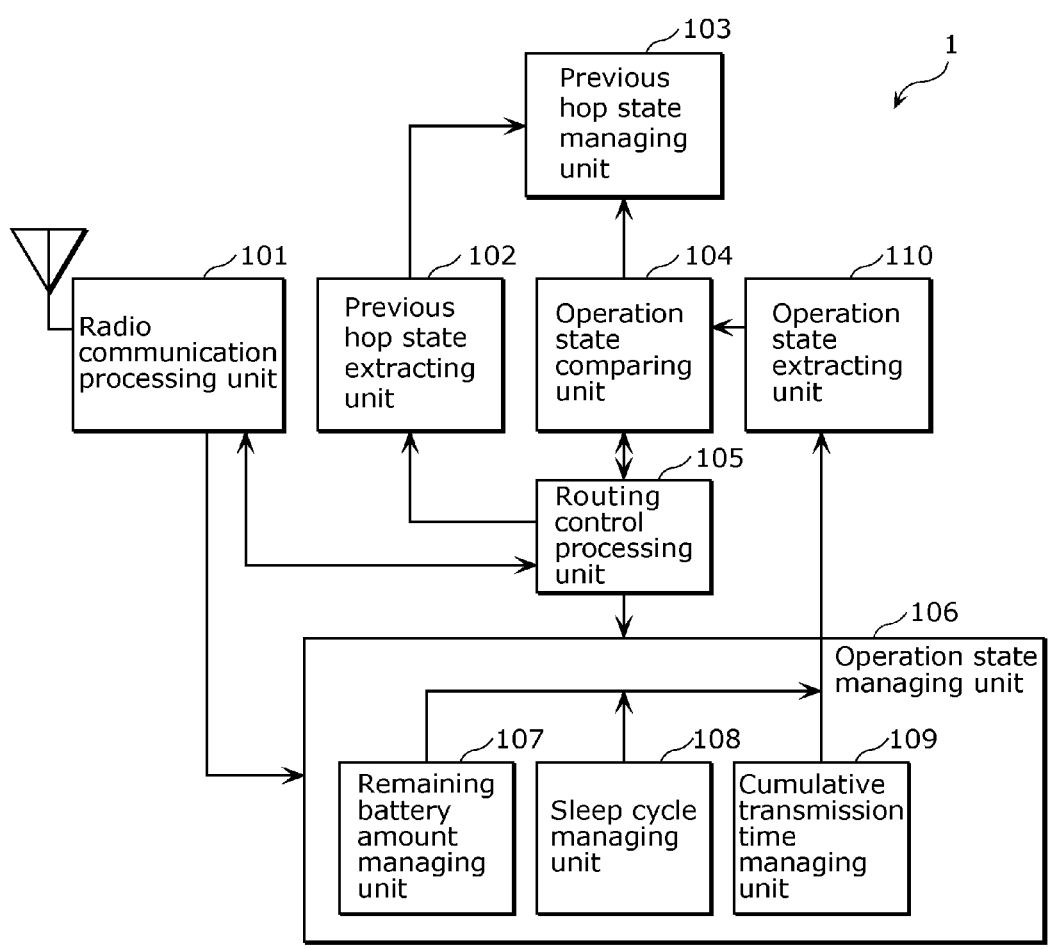
FIG. 1A illustrates a configuration of a routing control apparatus in an embodiment.

DESCRIPTION OF EMBODIMENTS (Underlying Knowledge Forming Basis of the Present Invention)

The inventors of the present invention found the following problems concerning ways of routing in the wireless mesh network described in the "Background Art" section.

A plurality of wireless communication apparatuses in the wireless mesh network configure a mesh topology and are interconnected to construct a network. A communication packet generated in the mesh network is transferred by an apparatus that functions as a routing control apparatus (router) in the mesh network and delivered to a destination. The wireless mesh network has been promoted for various uses such as a wireless sensor network, a smart meter utility network, or a home network that controls or monitors home electric appliances.

In the wireless mesh network, each terminal in the network generally serves as a routing control apparatus. In the following, the terminal has a function as a router, The routing control method in the conventional wireless mesh network includes the AODV routing and the RPL (see NPLs 1, 2, and 3, for example), In the AODV routing, a terminal in which communication data is generated (a source) transmits a route request packet into the wireless mesh network, and receives a route reply packet, which is a response to the transmitted route request packet, thereby constructing a path of the communication data leading to a destination. The routing control apparatuses located between the source and the destination transfer the route request packet. The routing control apparatus having information about the destination or the route to the destination (routing table) transfers the route reply packet, which is a response to the route request, to the source, The AODV routing uses a hop count to the destination as a metric, thereby acquiring a shortest hopping route. In the AODV routing, mainly two kinds of routing control messages, i.e., route request RREQ and route reply RREP are exchanged between the terminals.

The RPL uses a directed acyclic graph (DAG) for routing. In order to establish the DAG, three kinds of routing control signals called RPL control messages, i.e., DAG information object (DIO), DAG Information Solicitation (DIS) and Destination Advertisement Object (DAO) are exchanged, Each of the terminals transmits the DIO into the wireless mesh network. The terminal that has received the DIO updates DIO information as necessary, and transfers the DIO. Each of the terminals collects the DIO, establishes the DAG, and determines a path. The DIS is used for requesting the transmission of the DIO. After establishing the DAG, a path for downlink data in the DAG route is determined using the DAO. In the RPL, information to the destination is obtained from an intermediate node, whereby the path is constructed.

Examples of an application utilizing the wireless mesh network using such a routing control method include a telemeter or telecontrol radio station.

On the other hand, the Association of Radio Industries and Businesses has defined standard specifications of radio equipment utilizing radio waves (see NPL 4, for example). For instance, a specification of a specific low power radio station utilizing a 920 MHz band is defined, and an upper limit of the amount of sending time summed for one hour is specified.

Also, as a standard specification defining the physical layer and the MAC layer of communication apparatuses constituting the wireless mesh network, there is IEEE 802.15.4. Furthermore, in recent years, a standard specification IEEE 802.15.4e expanded to allow an operation in a power saving mode (sleep mode) also when the communication apparatus functions as a router has been set for power saving (see NPL 5, for example), PTL 1 discloses a technique concerning transferring of a route request in a wireless mesh network. More specifically, when an intermediate router in a transmission path in the wireless mesh network receives a route request, a link cost of the transmission path between a source apparatus and the router is added to a metric of the route request, thereby updating the metric. Then, when the updated metric is smaller than a metric in a routing table owned by the intermediate router, routing information to the source apparatus in the routing table is updated.

However, according to the above-noted technique, each of the terminals compares the metric of the transmission path from the source to the intermediate router and the metric on the routing table owned by the intermediate router, and determines whether or not the route request signal can be transferred. Thus, even if there is a router with a poor operation state from the source apparatus to the intermediate router, when other routers in the transmission path have a good operation state, there is a possibility that this transmission path may be selected. In this case, the path could be disconnected due to an operation condition of the router after several hops from the source apparatus. In such a case, since the router in the disconnected path has to deliver a signal for repairing the path to the source apparatus via several hops, there is a problem of increased costs at the time of a path loss.

Moreover, at the time of routing, the conventional system described above has failed to take into account that the router is operated in a power saving mode in which the router is operated while repeating a sleep mode and an awake mode and that the total transmission time of the router per unit time is limited. Thus, in the case of selecting the transmission path including the router that is operated in the sleep mode for a long time or the router having a long period of disabled transmission, a transfer delay increases, Accordingly, one non-limiting and exemplary embodiment of the present invention provides a routing control apparatus, etc., that construct a stable transmission path with a reduced control communication amount in a wireless mesh network. In other words, the present invention has been made to solve the problems described above, and an object of the present invention is to provide a routing control method in which operation conditions of routing control apparatuses capable of functioning as a router are considered and, if the operation condition of the subject apparatus is better than the operation condition of the routing control apparatus serving as a previous hop, the subject apparatus is operated as the routing control apparatus, thereby suppressing the risk of path loss occurrence and an increase in a delay amount in routing control apparatuses remote from the source, so that a stable path is constructed.

In order to solve the problems described above, a routing control apparatus according to one aspect of the present invention is a routing control apparatus that constructs a transmission path for transmitting communication data from a source apparatus to a destination apparatus in a wireless mesh network. The routing control apparatus includes: a previous hop managing unit configured to receive a first control signal for constructing a portion of the transmission path, and manage first information indicating operability, which is availability of a previous hop apparatus in a future, the portion being from the source apparatus to the routing control apparatus, and the previous hop apparatus being a source of the first control signal that has been received; an operation managing unit configured to manage second information indicating operability of the routing control apparatus; and a routing control unit configured to compare the first information and the second information, and, if the operability of the routing control apparatus is higher than or equal to the operability of the previous hop apparatus, transmit a second control signal for constructing a remaining portion of the transmission path other than the portion.

With this configuration, a routing control apparatus having an operation state at least equivalent to an operation state of a routing control apparatus serving as the previous hop apparatus is selected as a part of the transmission path. If the transmission path is disconnected, the disconnection is likely to occur at routing control apparatuses closer to the source. This makes it possible to suppress the cost of transferring a control signal for notification of the path loss. Also, with the configuration described above, a routing control apparatus having an operation state at least equivalent to an operation state of the previous hop apparatus is selected as a part of the transmission path. Accordingly, data that has been successfully transferred to the next hop can be transferred in a more stable path, thus constructing a more stable path. Then, it is possible to construct a transmission path while selecting an apparatus having a good operation state downstream along the transmission path. Consequently, the routing control apparatus can construct a stable transmission path with a reduced control communication amount.

For example, the previous hop managing unit may be configured to receive the first control signal including the first information, obtain the first information from the first control signal that has been received, and manage the first information that has been obtained.

With this configuration, the routing control apparatus can obtain operation information of the previous hop apparatus from the previous hop apparatus by the control signal. Thus, the routing control apparatus can construct the transmission path efficiently by exchanging only the control signal with the previous hop apparatus.

For example, the routing control unit may be configured to make a transmission of the second control signal if the routing control apparatus does not receive a third control signal for construction of another portion of the transmission path by an apparatus that is included in the wireless mesh network and has received the first control signal until a predetermined period elapses after the previous hop managing unit receives the first control signal even when the operability of the routing control apparatus is lower than the operability of the previous hop apparatus, the another portion being from the apparatus to the destination apparatus.

With this configuration, the routing control apparatus can construct an appropriate path even when there is no apparatus having a better operation state than the previous hop apparatus. The routing control apparatus constructs the transmission path while selecting an apparatus having a good operation state downstream as described above, and, if the operation state of the downstream apparatus is poor, the transmission path is not constructed. In such a case, the routing control apparatus can use the apparatus having the poor operation state so as to avoid a risk that no transmission path can be constructed.

For example, each of the previous hop apparatus and the routing control apparatus may be operated by power supplied from a battery. The first information may include a first remaining battery amount of the previous hop apparatus, the operability of the previous hop apparatus rising with an increase in the first remaining battery amount. The operation managing unit may be configured to manage the second information including a second remaining battery amount of the routing control apparatus, the operability of the routing control apparatus rising with an increase in the second remaining battery amount.

With this configuration, a routing control apparatus having a remaining battery amount at least equivalent to a remaining battery amount of the previous hop apparatus serves as a part of the transmission path. Accordingly, it is possible to suppress the path loss occurrence arising from a routing control apparatus more remote from a source, thus constructing a more stable path, For example, the first information may include first operable time calculated based on the first remaining battery amount, the first operable time being a period for which the previous hop apparatus is operable in the future, and the operability of the previous hop apparatus rising with an increase in the first operable time. The operation managing unit may be configured to manage the second information including second operable time calculated based on the second remaining battery amount, the second operable time being a period for which the routing control apparatus is operable in the future, and the operability of the routing control apparatus rising with an increase in the second operable time.

With this configuration, a routing control apparatus having operable time at least equivalent to operable time of the previous hop apparatus serves as a part of the transmission path. Accordingly, it is possible to suppress the path loss occurrence arising from a routing control apparatus more remote from a source, thus constructing a more stable path.

For example, each of the previous hop apparatus and the routing control apparatus may transition between a sleep mode and a normal mode in every sleep cycle. The first information may include a first sleep cycle of the previous hop apparatus, the operability of the previous hop apparatus rising with an increase in the first sleep cycle. The operation managing unit may be configured to manage the second information including a second sleep cycle of the routing control apparatus, the operability of the routing control apparatus rising with an increase in the second sleep cycle.

With this configuration, a routing control apparatus having a sleep cycle at least equivalent to a sleep cycle of the previous hop apparatus serves as a part of the transmission path. Accordingly, it is possible to suppress the path loss occurrence arising from a routing control apparatus more remote from a source, thus constructing a more stable path.

For example, the first information may include a first operating rate of the previous hop apparatus, the first operating rate being calculated based on the first sleep cycle, and the operability of the previous hop apparatus rising with an increase in the first operating rate. The operation managing unit may be configured to manage the second information including a second operating rate of the routing control apparatus, the second operating rate being calculated based on the second sleep cycle, and the operability of the routing control apparatus rising with an increase in the second operating rate.

With this configuration, a routing control apparatus having an operating rate at least equivalent to an operating rate of the previous hop apparatus serves as a part of the transmission path. Accordingly, it is possible to suppress the path loss occurrence arising from a routing control apparatus more remote from a source, thus constructing a more stable path.

For example, the first information may include first cumulative transmission time, which is a cumulative value of past data communication time of the previous hop apparatus per unit time, the operability of the previous hop apparatus lowering with an increase in the first cumulative transmission time. The operation managing unit may be configured to manage the second information including second cumulative transmission time, which is a cumulative value of past data communication time of the routing control apparatus per unit time, the operability of the routing control apparatus lowering with an increase in the second cumulative transmission time, With this configuration, a routing control apparatus having a cumulative value of past data communication time per unit time at least equivalent to a cumulative value of past data communication time of the previous hop apparatus per unit time serves as a part of the transmission path. Accordingly, it is possible to exclude a path including a routing control apparatus having a large transmission amount and a routing control apparatus to which data is prohibited from being transmitted, thus suppressing an increase in transfer delay.

For example, each of the previous hop apparatus and the routing control apparatus may have an upper limit of data transmission time per unit time, the upper limit being set in advance. The first information may include first transmissible time, which is an upper limit of future data transmission time of the previous hop apparatus per unit time, the operability of the previous hop apparatus rising with an increase in the first transmissible time. The operation managing unit may be configured to manage the second information including second transmissible time, which is an upper limit of future data transmission time of the routing control apparatus per unit time, the operability of the routing control apparatus rising with an increase in the second transmissible time.

With this configuration, a routing control apparatus having transmissible time per unit time at least equivalent to transmissible time of the previous hop apparatus per unit time serves as a part of the transmission path. Accordingly, it is possible to exclude a path including a routing control apparatus having a large transmission amount and a routing control apparatus to which data is prohibited from being transmitted, thus suppressing an increase in transfer delay.

For example, the first information may include a plurality of kinds of information indicating the operability of the previous hop apparatus, and the second information may include a plurality of kinds of information that indicates the operability of the routing control apparatus and is of a same kind with the information included in the first information. The previous hop managing unit may be configured to calculate the operability of the previous hop apparatus based on one specific kind of information among the plurality of kinds of information included in the first information. The operation managing unit may be configured to calculate the operability of the previous hop apparatus based on the one specific kind of information among the plurality of kinds of information included in the second information. The routing control unit may further include a switching unit configured to switch a kind of information used in calculation by the previous hop managing unit and the operation managing unit from the one specific kind to another kind if the routing control apparatus does not receive a control signal transmitted by an apparatus that is included in the wireless mesh network and has received the first control signal until a predetermined period elapses after the previous hop managing unit receives the first control signal even when the operability of the routing control apparatus is lower than the operability of the previous hop apparatus.

With this configuration, the routing control apparatus can construct a more stable path by selecting a path including a routing control apparatus having an appropriate condition according to a property of data dealt by the source apparatus or the destination apparatus.

For example, the first information may include a plurality of kinds of information indicating the operability of the previous hop apparatus, and the second information may include a plurality of kinds of information that indicates the operability of the routing control apparatus and is of a same kind with the information included in the first information. The previous hop managing unit may be configured to calculate the operability of the previous hop apparatus based on a combination of two or more specific kinds of information among the plurality of kinds of information included in the first information. The operation managing unit may be configured to calculate the operability of the previous hop apparatus based on the combination of two or more specific kinds of information among the plurality of kinds of information included in the second information. The routing control unit may further include a switching unit configured to switch a combination of two or more kinds of information used in calculation by the previous hop managing unit and the operation managing unit from the combination of two or more specific kinds of information to another combination thereof if the routing control apparatus does not receive a control signal transmitted by an apparatus that is included in the wireless mesh network and has received the first control signal until a predetermined period elapses after the previous hop managing unit receives the first control signal even when the operability of the routing control apparatus is lower than the operability of the previous hop apparatus.

With this configuration, the routing control apparatus can construct a more stable path by selecting a path including a routing control apparatus having an appropriate condition according to a property of data dealt by the source apparatus or the destination apparatus, Furthermore, a routing control method according to one aspect of the present invention is a routing control method performed in a routing control apparatus that constructs a transmission path for transmitting communication data from a source apparatus to a destination apparatus in a wireless mesh network. The routing control method includes: receiving a first control signal for constructing a portion of the transmission path, and managing first information indicating operability, which is availability of a previous hop apparatus in a future, the portion being from the source apparatus to the routing control apparatus, and the previous hop apparatus being a source of the first control signal that has been received; managing second information indicating operability of the routing control apparatus; and comparing the first information and the second information, and, if the operability of the routing control apparatus is higher than or equal to the operability of the previous hop apparatus, transmitting a second control signal for constructing a remaining portion of the transmission path other than the portion.

This produces an advantageous effect similar to the routing control apparatus described above.

Moreover, a program according to one aspect of the present invention is a program for causing a computer to execute the routing control method described above.

This produces an advantageous effect similar to the routing control apparatus described above.

The following is a specific description of an embodiment, with reference to the accompanying drawings.

It should be noted that any embodiment described below will illustrate a generic or specific example. The numerical values, shapes, materials, structural components, the arrangement and connection of the structural components, steps and the order of the steps mentioned in the following embodiment are merely an example and not intended to limit the present invention. Further, among the structural components in the following embodiment, the one that is not recited in any independent claim exhibiting the most generic concept will be described as an arbitrary structural component.

Embodiment

FIG. 1A to FIG. 12 illustrate a routing control apparatus and a routing control method according to an embodiment.

FIG. 1A is a block diagram illustrating a configuration of the routing control apparatus in the present embodiment.

As illustrated in FIG. 1A, a routing control apparatus 1 includes a radio communication processing unit 101, a previous hop state extracting unit 102, a previous hop state managing unit 103, an operation state comparing unit 104, a routing control processing unit 105, an operation state managing unit 106, and an operation state extracting unit 110.

This routing control apparatus has a routing table and a neighboring table necessary for functioning as a router. Furthermore, if the routing control is performed by routeover, the routing control apparatus also has a function as a layer higher than or equal to an IP layer such as Internet Protocol (IP).

The radio communication processing unit 101 includes an RF circuit that transmits and receives radio waves, and a processing unit that performs a baseband processing according to communications standards by conversion between an analog signal and a digital signal dealt by the RF circuit. The radio communication processing unit 101 performs a processing of a physical layer and control conforming to a specified protocol such as a media access control or a logical link control, More specifically, the radio communication processing unit 101 transmits and receives radio signals according to a system specified by IEEE 802.15.4, IEEE 802.15.4g or IEEE 802.15.4e. The radio communication processing unit 101 performs a processing of decoding a received radio signal, converting it to digital data and passing a corresponding data string to an upper layer (not shown) or the routing control processing unit 105 as necessary, and a processing of subjecting a routing control signal received from the routing control processing unit 105 and the data string received from the upper layer (not shown) to a predetermined modulation system and sending them out to a wireless medium at appropriate timing.

The previous hop state extracting unit 102 extracts operation state information of a previous hop from the signal received by the radio communication processing unit 101.

More specifically, the previous hop state extracting unit 102 performs a processing of extracting operation state information of a previous hop routing control apparatus from a communication packet such as a routing control signal or a neighbor advertisement signal received from a neighboring routing control apparatus serving as a previous hop and passing the operation state information to the previous hop state managing unit 103, Here, the neighbor advertisement signal is a neighbor solicitation (NS) for resolving an address of a specific routing control apparatus or a neighbor advertisement (NA) for advertisement of a response to NS, Furthermore, the previous hop is a neighboring terminal upstream to the routing control apparatus 1 on a transmission path from a source apparatus to a destination apparatus of communication data in a wireless mesh network, and is also referred to as a previous hop (immediately previous hop) apparatus. Incidentally, in the transmission path, a direction from the source apparatus to the destination apparatus is also referred to as a transmission direction or a downstream direction, and a direction from the destination apparatus to the source apparatus is also referred to as an upstream direction.

The previous hop state managing unit 103 stores and manages the extracted previous hop operation state information.

More specifically, the previous hop state managing unit 103 stores and manages the operation state information of the previous hop received from the previous hop state extracting unit 102 in a storage (for example, a RAM 203 or a storage device 204 in FIG. 1B) together with an identifier of the previous hop. Moreover, the previous hop state managing unit 103 passes the operation state information of the previous hop that is managed to the operation state comparing unit 104. It should be noted that the previous hop state managing unit 103 may manage the operation state information of the previous hop in association with the neighboring table or the routing table.

The operation state comparing unit 104 compares the operation state information of the previous hop and operation state information of the subject apparatus. Here, the operation state information is information indicating a future operability and will be described later more specifically.

More specifically, upon receipt of the routing control signal, the operation state comparing unit 104 accepts an operation state comparison request from the routing control processing unit 105. The operation state comparing unit 104 compares operation state information of the previous hop designated by the accepted operation state comparison request among pieces of the operation state information of the previous hop stored in the previous hop state managing unit 103 (corresponding to first information) and operation state information of the routing control apparatus 1 extracted via the operation state extracting unit 110 (corresponding to second information), The operation state comparing unit 104 notifies the routing control processing unit 105 of the comparison result.

The routing control processing unit 105 processes a routing control signal based on the result of comparing the operation states, More specifically, the routing control processing unit 105 passes the routing control signal received from the radio communication processing unit 101 or the operation state information in the neighbor advertisement signal to the previous hop state extracting unit 102. Also, when the routing control signal is received from the radio communication processing unit 101, the routing control processing unit 105 makes a request for comparison of the operation state information to the operation state comparing unit 104. The routing control processing unit 105 receives the comparison result from the operation state comparing unit 104 and, based on the received comparison result, determines whether to process the routing control signal received from the radio communication processing unit 101. If the routing control signal is to be processed, the routing control processing unit 105 generates a routing control signal according to a routing system such as RPL or AODV for a later response or transfer of a routing control signal, and passes the generated routing control signal to the radio communication processing unit 101.

The operation state managing unit 106 manages the operation state information of the routing control apparatus 1. The operation state managing unit 106 has one or more functional blocks providing operation state information, More specifically, the operation state managing unit 106 includes at least one of a remaining battery amount managing unit 107, a sleep cycle managing unit 108, and a cumulative transmission time managing unit 109. Then, the operation state managing unit 106 passes, to the operation state extracting unit 110, the operation state information provided from these functional blocks.

In the case where the routing control apparatus 1 is operated by power supplied from a battery, namely, battery-driven, the remaining battery amount managing unit 107 records and manages a remaining battery amount.

When the routing control apparatus 1 can be operated in either a sleep mode (power saving mode) or an awake mode (normal mode), the sleep cycle managing unit 108 manages a sleep cycle and a remaining time until a next sleep start. The sleep mode is a mode in which the routing control apparatus 1 can receive communication data from an external apparatus but does not transmit any data to an external apparatus. In the sleep mode, the routing control apparatus 1 suppresses an information processing amount compared with the normal mode, thereby being operable with a reduced power consumption (power savings are achieved).

The sleep cycle managing unit 108 stores information to be managed in a storage and manages the information, for example. The sleep cycle managing unit 108 manages mode transition between the sleep mode and a sleep release mode (awake mode) of the routing control apparatus 1. Then, the sleep cycle managing unit 108 calculates an average value of an awake period with respect to a sleep cycle, and stores and manages the average value in the storage.

In the case of a radio communication system in which a limit of transmission time of the routing control apparatus 1 is defined, the cumulative transmission time managing unit 109 receives necessary time information of radio transmission in the radio communication processing unit 101, and records and manages cumulative transmission time information per unit time.

The operation state extracting unit 110 extracts operation state information from the operation state managing unit 106. Then, the operation state extracting unit 110 passes the extracted operation state information to the operation state comparing unit 104 for comparison.

In response to the request from the operation state comparing unit 104, the operation state extracting unit 110 extracts corresponding state information of its own terminal from the operation state managing unit 106 and passes it to the operation state comparing unit 104. When the operation state managing unit 106 owns plural kinds of operation state information, the operation state information to be extracted may be switched according to the request from the operation state comparing unit 104, or the combination of the kinds of operation state information to be extracted may be changed according to the request from the operation state comparing unit 104.

Figure 1B:
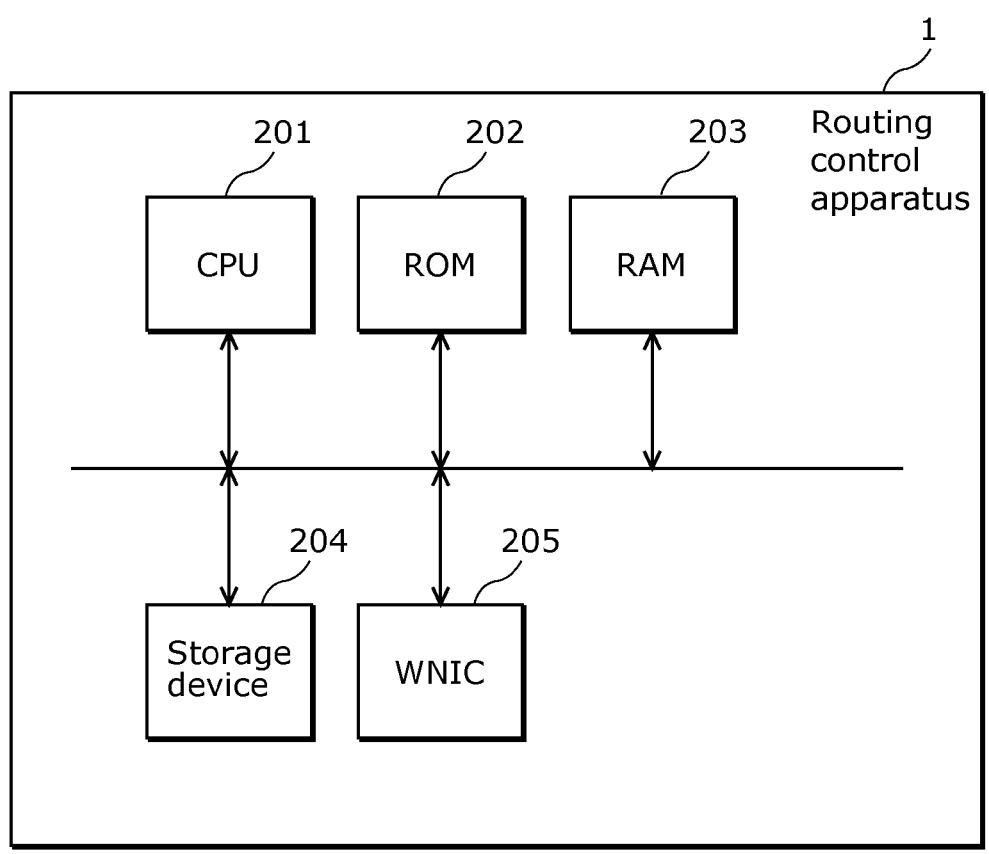
FIG. 1B is a block diagram illustrating a hardware configuration of a routing control apparatus in an embodiment.

FIG. 1B is a block diagram illustrating a hardware configuration of the routing control apparatus in the present embodiment.

As illustrated in FIG. 1B, the routing control apparatus 1 includes a central processing unit (CPU) 201, a read only memory (ROM) 202, a random access memory (RAM) 203, a storage device 204, and a wireless network interface card (WNIC) 205.

The CPU 201 is a processor that executes a control program stored in the ROM 202.

The ROM 202 is a read-only storage region that holds a control program, etc.

The RAM 203 is a volatile storage region serving as a work area that is used when the CPU 201 executes the control program, The storage device 204 is a non-volatile storage region that holds the control program or data, etc.

The WNIC 205 is a radio communication interface that establishes a wireless link to an external radio communication apparatus and communicates with that apparatus. There is no particular limitation to the kind of the radio communication interface. In other words, the WNIC 205 may be a wireless LAN interface adapted to IEEE 802.11a, b, g, etc., or may be other radio communication interfaces.

It should be noted that each of the radio communication processing unit 101, the previous hop state extracting unit 102, the previous hop state managing unit 103, the operation state comparing unit 104, the routing control processing unit 105, the operation state managing unit 106 and the operation state extracting unit 110 illustrated in FIG. 1A may have a configuration that functions by storing a program for realizing an operation of each of them in a storage and allowing a CPU (the CPU 201 in FIG. 1B) to execute that program, for example.

Although not shown in the figure, the routing control apparatus 1 may further include a user interface. The user interface is provided for a user to select and execute an operation of the routing control apparatus 1 and may be, for example, a key, a touch panel, a display, a codec, a microphone, a speaker, a camera, or a vibrator.

Figure 2:
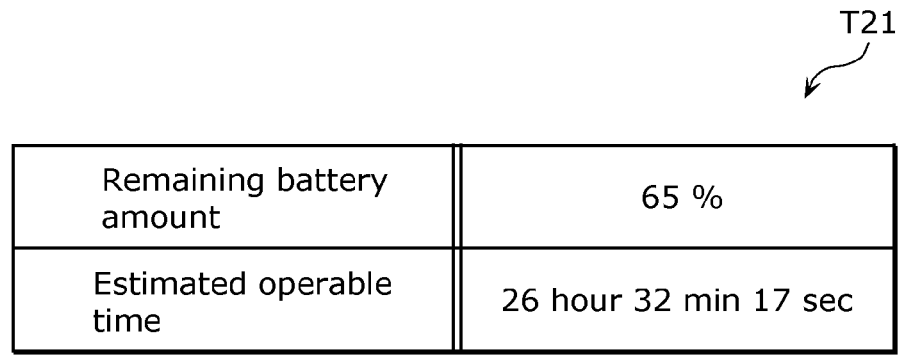
FIG. 2 illustrates management information in a remaining battery amount managing unit in a routing control apparatus in an embodiment.

FIG. 2 illustrates an example of management information in the remaining battery amount managing unit 107.

Management information T21 illustrated in FIG. 2 includes remaining battery amount information and estimated operable time information based on the remaining battery amount. The estimated operable time information is information that is calculated based on the remaining battery amount and indicates time during which the routing control apparatus 1 is operable from now on (in the future) without any battery charging.

The example illustrated in FIG. 2 indicates that the remaining battery amount of the routing control apparatus 1 is 65% and that the routing control apparatus 1 is estimated to be still operable for 26 hours 32 minutes 17 seconds in view of a power consumption condition so far. The remaining battery amount information may be managed by a remaining amount of current, etc. Although these values are updated upon receipt of the routing control signal, they may be updated by battery information that is read periodically or updated based on an interrupt that is set to be issued when a certain amount of battery is consumed.

Figure 3:
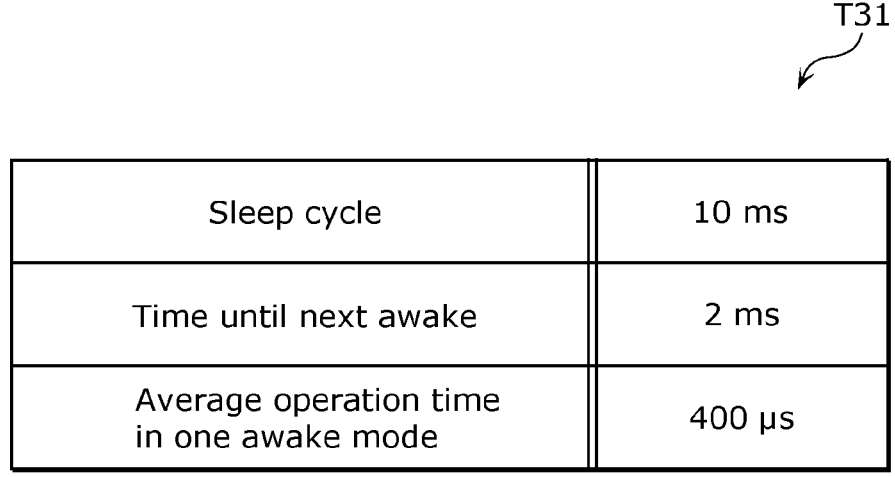
FIG. 3 illustrates management information in a sleep cycle managing unit in a routing control apparatus in an embodiment.

FIG. 3 illustrates an example of management information in the sleep cycle managing unit 108.

Management information T31 illustrated in FIG. 3 includes sleep cycle information, time-until-next-awake information, and information about average operation time in one awake mode. Here, the "time-until-next-awake information" is information indicating time until the sleep mode transitions to the awake mode next after a current time.

The example illustrated in FIG. 3 indicates that the sleep cycle is 10 ms, that the sleep mode transitions to the awake mode 2 ms after the current time, and that the routing control apparatus 1 is operable for an average of 400 μs in the awake mode. Although these values are updated upon receipt of the routing control signal, they may be updated periodically or updated based on an interrupt that is set to be issued when a certain time elapses.

Figure 4:
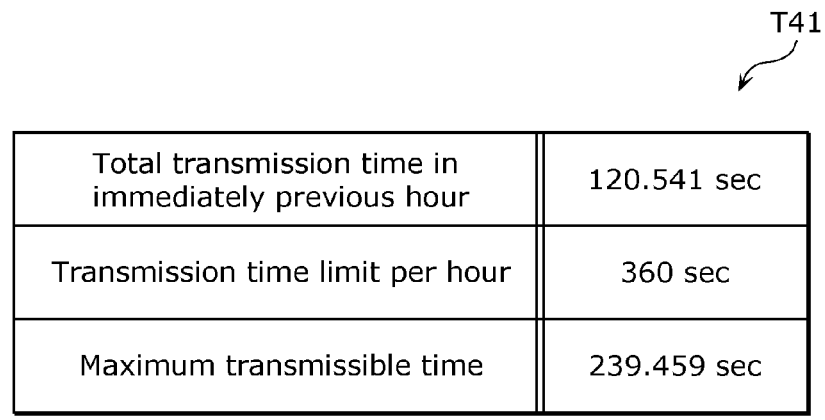
FIG. 4 illustrates management information in a cumulative transmission time managing unit in a routing control apparatus in an embodiment.

FIG. 4 illustrates an example of management information in the cumulative transmission time managing unit 109.

Management information T41 illustrated in FIG. 4 includes information about total transmission time in an immediately previous hour, information about transmission time limit per hour, and maximum transmissible time information. Maximum transmissible time information indicates maximum time for which the signal can be currently transmitted, The example illustrated in FIG. 4 indicates that the total transmission time in an immediately previous hour is 120.541 seconds, that the transmission time limit per hour is 360 seconds, and that, from the difference between these, the maximum transmissible time is 239.459 seconds. These values are updated every time the radio communication processing unit 101 executes the transmission processing.

Management information T21, management information T31, and management information T41 are merely examples. Other forms of information may be used for the management as long as they are equivalent to the above-noted management information. Alternatively, part of such management information may be used for the management, The following is a description of a path construction flow in a wireless mesh network configured by the above-described routing control apparatus and an operation of the routing control apparatus.

Figure 5:
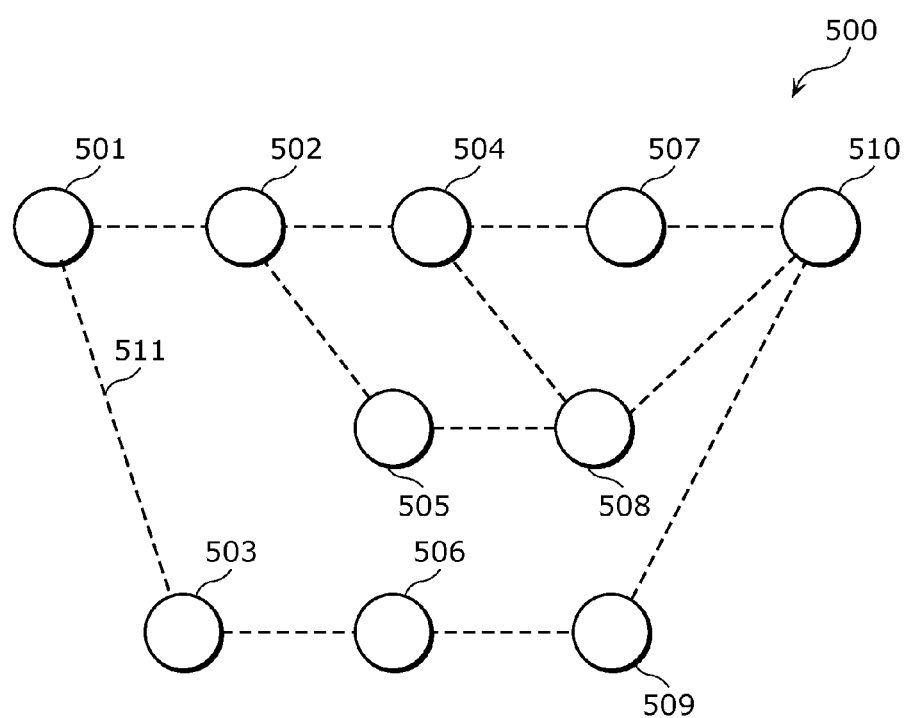
FIG. 5 illustrates a mesh network configured by a routing control apparatus in an embodiment.
Figure 6:
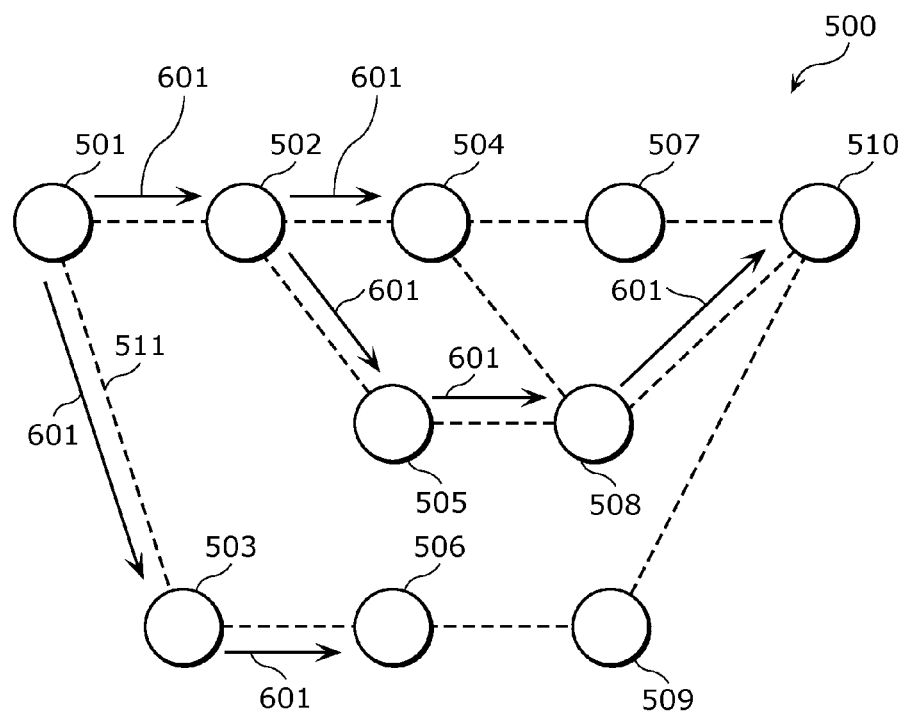
FIG. 6 illustrates how a routing control signal is propagated in a mesh network configured by a routing control apparatus in an embodiment.
Figure 7:
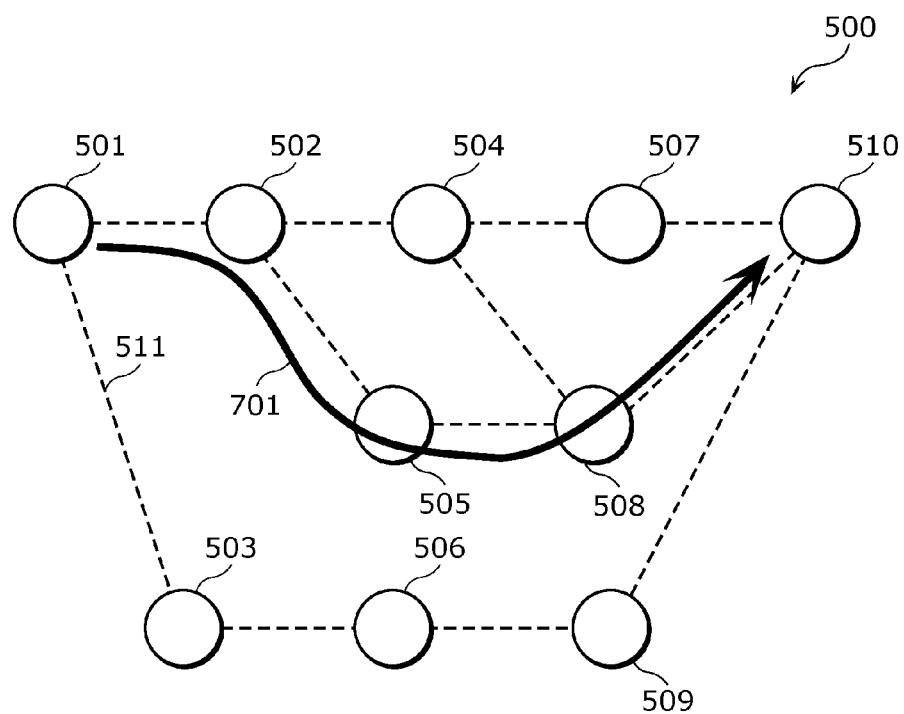
FIG. 7 illustrates a communication path in a mesh network configured by a routing control apparatus in an embodiment.

FIG. 5, FIG. 6, and FIG. 7 illustrate how a path is constructed in a wireless mesh network 500 constituted by configurations including the routing control apparatus 1. Each of routing control apparatuses 501 to 510 is equivalent to the routing control apparatus 1 described above. In the wireless mesh network 500, a path is constructed between the source routing control apparatus 501 corresponding to the routing control apparatus serving as a data source and the destination routing control apparatus 510 corresponding to the routing control apparatus serving as a destination.

FIG. 5 illustrates the wireless mesh network 500 in a state where a transmission path from the routing control apparatus 501 to the routing control apparatus 510 is not yet constructed. The source routing control apparatus 501, the routing control apparatuses 502 to 507, and the destination routing control apparatus 510 that can directly communicate with each other by radio waves are connected by dashed lines. In other words, the source routing control apparatus 501 serving as the source can directly communicate with the routing control apparatuses 502 and 503 but cannot directly communicate with the other routing control apparatuses by radio waves. The destination routing control apparatus 510 serving as the destination can directly communicate with each of the routing control apparatuses 507, 508 and 509 but cannot directly communicate with the other routing control apparatuses by radio waves.

FIG. 6 illustrates how a routing control signal is propagated from the source routing control apparatus 501 to the destination routing control apparatus 510. Also, FIG. 7 illustrates a path that is constructed as a result of the propagation of the routing control signal.

In FIG. 6, a routing control signal 601 is illustrated. The routing control signal 601 is first transmitted by the routing control apparatus 501. Each of the routing control apparatuses that has received the routing control signal 601 transfers the received routing control signal to a neighboring routing control apparatus with which it can directly communicate by multicast, broadcast or unicast according to a response propriety condition.

More specifically, first, in order to construct the path from the routing control apparatus 501 to the destination routing control apparatus 510, the routing control apparatus 501 transmits the routing control signal 601. In the routing control signal 601, an identifier of the routing control apparatus 510 is described as information for specifying the destination routing control apparatus. The routing control apparatuses 502 and 503 that have received this routing control signal transfer the routing control signal 601 because they are not the destination routing control apparatus 510 but next hops of the routing control apparatus 501.

Each of the routing control apparatuses 504 and 505 that have received the routing control signal 601 transferred via the routing control apparatus 502 and the routing control apparatus 506 that has received the routing control signal 601 transferred via the routing control apparatus 503 is neither the destination routing control apparatus 510 nor a next hop of the source routing control apparatus 501, and thus determines whether to respond to the routing control signal 601.

If the result of the determination shows that the operation state of the routing control apparatus 505 is at least equivalent to the operation state of the routing control apparatus 502 serving as the previous hop, the routing control apparatus 505 further transfers the received routing control signal 601. If the operation states of the routing control apparatuses 504 and 506 are poorer than the operation states of the routing control apparatuses 502 and 503 serving as the previous hops, respectively, the routing control apparatuses 504 and 506 do not respond to the routing control signal 601. Also, if the operation state of the routing control apparatus 508 is at least equivalent to the operation state of the routing control apparatus 505, the routing control apparatus 508 transfers the routing control signal 601 and delivers the routing control signal to the destination routing control apparatus 510.

By exchanging the routing control signal 601 between the source routing control apparatus 501 and the destination routing control apparatus 510, a communication path 701 illustrated in FIG. 7 is constructed.

It should be noted that the routing control apparatuses 502 to 509 that have detected the transmission of the routing control signal, which is a response to the already received routing control signal, do not have to transfer or respond to the routing control signal 601, The reason is that, since the above-noted routing control signal 601 has been transmitted from another routing control apparatus (not the subject apparatus) in response to the already received routing control signal, such another routing control apparatus is considered to construct the transmission path even if the subject apparatus does not transfer or respond to the routing control signal 601.

Figure 8:
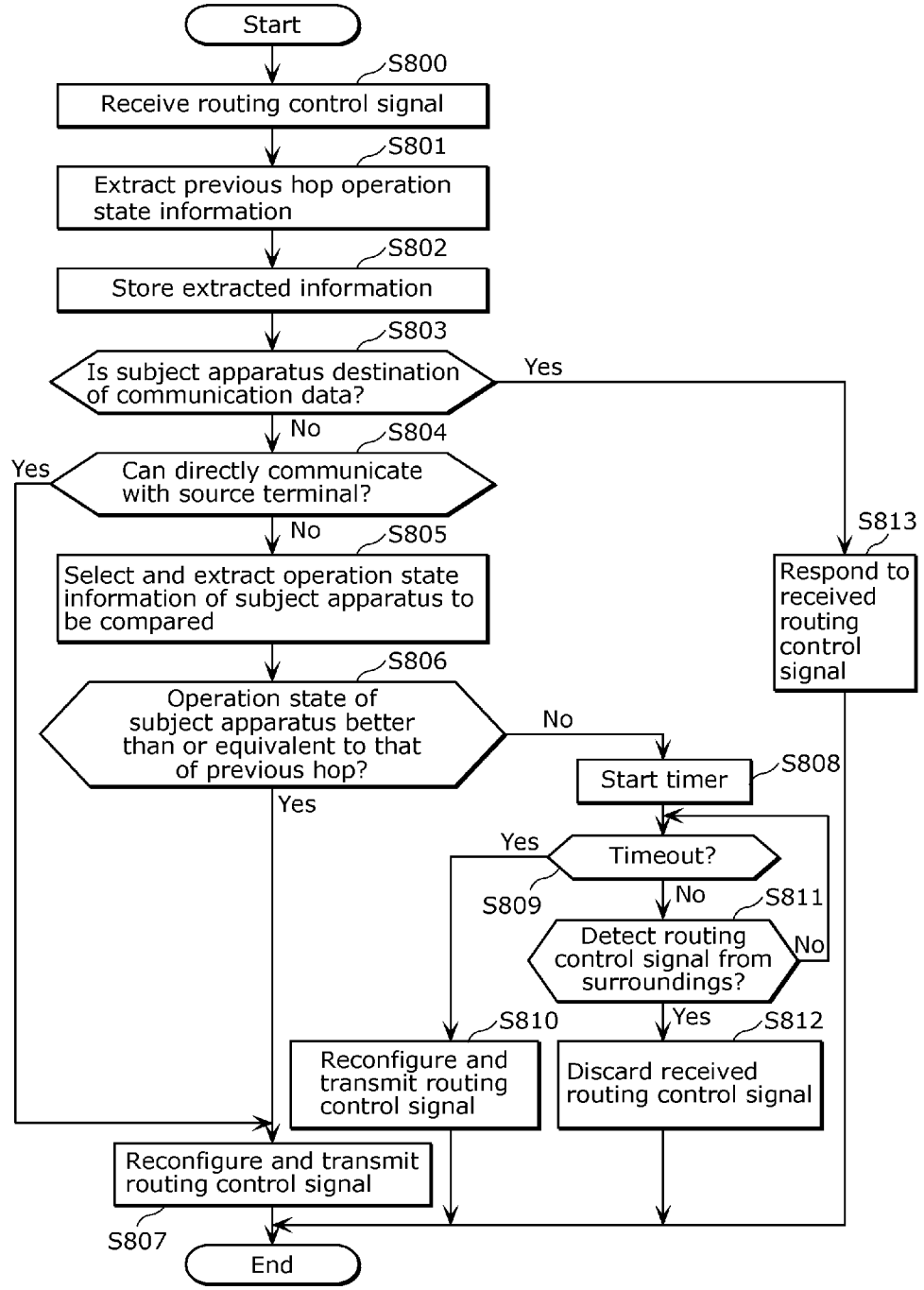
FIG. 8 is a flowchart illustrating a routing control method of a routing control apparatus in an embodiment.

FIG. 8 is a flowchart illustrating a routing control method of the routing control apparatus in the present embodiment.

In Step S800, the routing control apparatus 1 (the radio communication processing unit 101) receives the routing control signal 601. Upon receipt of the routing control signal 601, the routing control apparatus 1 once cancels the sleep mode if the sleep mode is enabled.

In Step S801, the routing control processing unit 105 passes content of the routing control signal 601 received in Step S800 to the previous hop state extracting unit 102. The previous hop state extracting unit 102 extracts the operation state information provided in the routing control signal received from the routing control processing unit 105, The operation state information provided in the routing control signal will be detailed later.

In Step S802, the previous hop state extracting unit 102 passes the operation state information extracted in Step S801 to the previous hop state managing unit 103 and record it in the previous hop state managing unit 103.

In Step S803, the routing control processing unit 105 determines whether or not the subject apparatus is the routing control apparatus 510 serving as the destination of the communication data.

If it is determined that the subject apparatus is not the destination routing control apparatus 510 in Step S803 (No in Step S803), it is determined whether or not the subject apparatus can directly communicate with the source routing control apparatus 501 in Step S804.

If it is determined that the subject apparatus can directly communicate with the source routing control apparatus 501 in Step S804, the routing control processing unit 105 adds the operation state information of the subject apparatus to the routing control signal received in Step S800 or reconfigures an updated routing control signal, and passes the reconfigured routing control signal to the radio communication processing unit 101 for transfer in Step S807. The radio communication processing unit 101 performs a processing according to corresponding wireless communications standards and sends out the routing control signal to a radio communication channel. Incidentally, it is determined that the subject apparatus can directly communicate with the source routing control apparatus 501 when the subject apparatus is located close to the source routing control apparatus 501, for example. However, there are some cases where the subject apparatus and the source routing control apparatus 501 cannot directly communicate with each other even if they are located close to each other, for example, when shielding against radio waves is present between the routing control apparatus and the source routing control apparatus 501.

If it is determined that the subject apparatus cannot directly communicate with the source routing control apparatus 501 in Step S804, namely, that the subject apparatus can communicate with the source routing control apparatus 501 via another routing control apparatus, the routing control processing unit 105 makes an operation state comparison request to the operation state comparing unit 104 in Step S805. The operation state comparing unit 104 that has received the comparison request selects corresponding information to be compared from the operation state managing unit 106 via the operation state extracting unit 110.

At this time, the information to be selected may be fixed depending on a system. Alternatively, the information may be switched according to corresponding information included in the routing control signal so that only one piece of information is extracted. Furthermore, when the routing control signal includes a plurality of pieces of operation state information, the operation state comparing unit 104 may also extract a combination of one or more pieces of the operation state information. Moreover, the operation state comparing unit 104 may switch (change) the combination of one or more pieces of the operation state information as necessary.

In Step S806, the operation state comparing unit 104 compares the operation states of the subject apparatus and the previous hop based on the operation state information extracted in Step S805 and the operation state information of the previous hop, and notifies the routing control processing unit 105 of the result of comparison. When the extracted information is any of the remaining battery amount information, the sleep cycle information and the cumulative transmission time information, the operation state comparing unit 104 makes a determination using that information alone.

For example, when the extracted information is the remaining battery amount information, the operation state comparing unit 104 compares the remaining battery amount information illustrated in FIG. 2 or FIG. 12, If the remaining battery amount of the previous hop having an apparatus identifier IP1 is 55% and the remaining battery amount of the subject apparatus having an apparatus identifier IP2 is 65%, the operation state comparing unit 104 determines that the subject apparatus has a better operation state than the routing control apparatus of the previous hop. It should be noted that the estimated operation time may be compared instead of the remaining battery amount information.

For example, when the extracted information is the sleep cycle information, the operation state comparing unit 104 compares the sleep cycle information illustrated in FIG. 3 or FIG. 12. If the sleep cycle of the previous hop (IP1) is 50 ms and that of the subject apparatus (IP2) is 10 ms, the operation state comparing unit 104 determines that the subject apparatus has a better operation state than the routing control apparatus of the previous hop. Also, instead of the sleep cycle information, time-until-next-start information (time until the sleep mode transitions to the awake mode next) or information about average operation time per sleep cycle (operation time of one awake mode) may be compared. The state is determined to be better as the time until next start is shorter and as the average operation time per awake mode is longer.

For example, when the cumulative transmission time information is to be compared, the operation state comparing unit 104 compares the cumulative transmission time information illustrated in FIG. 4 or FIG. 12. Since the previous hop (IP1) has a total transmission time for an immediately previous hour of 121.550 sec and the subject apparatus (IP2) has a total transmission time of 120.541 sec, the subject apparatus can transmit the signal for longer time before the transmission limit is reached. Thus, the operation state comparing unit 104 determines that the subject apparatus has a better operation state. Furthermore, the operation state comparing unit 104 may also compare the maximum transmissible time instead of the total transmission time for an immediately previous hour and determine that the state is better as the maximum transmissible time is longer.

When a plurality of pieces of information are extracted, the operation state comparing unit 104 may make a determination by combining these pieces of information according to their priorities, or may compare a metric calculated by combining these pieces of information. The priorities may be defined in advance in the system. Alternatively, priority information may be set to each of the message formats illustrated in FIG. 9 to FIG. 11, and the priorities may be defined according to a priority of the priority information.

If the determination result in Step S806 shows that the operation state of the subject apparatus is equivalent to or better than the operation state of the previous hop, the routing control processing unit 105 updates the content of the operation state information included in the received routing control signal to be the operation state information of the subject apparatus, thereby reconfiguring the routing control signal in Step S807. Then, the routing control processing unit 105 passes the reconfigured routing control signal to the radio communication processing unit 101 for transfer. The radio communication processing unit 101 performs the processing according to the corresponding wireless communications standards and sends out the routing control signal to the radio communication channel, If the routing control processing unit 105 receives the result of determination in Step S806 that the operation state of the subject apparatus is poorer than the operation state of the previous hop, the routing control processing unit 105 starts a timer for waiting for transfer of the routing control signal in Step S808. This timer is utilized for avoiding a risk that no path can be constructed at all if all of the routing control apparatuses that can directly communicate with the previous hop have a poorer operation state than the previous hop.

In Step S809, the routing control processing unit 105 determines whether or not the timer has expired.

If it is determined that the timer has not expired in Step S809 (No in Step S809), the routing control processing unit 105 monitors whether or not there has been any transfer of the routing control signal or response from surrounding routing control apparatuses in Step S811. Incidentally, the determination in S811 is repeated until the timer expires, If the routing control signal from the surrounding routing control apparatuses is detected in Step S811, namely, the response to or transfer of the routing control signal from other routing control apparatuses is detected (Yes in Step S811), the routing control processing unit 105 discards the received routing control signal and does not perform the transfer processing in Step S812.

If the expiration of the timer is detected without detecting the response to the corresponding routing control signal from other routing control apparatuses or the transfer from other routing control apparatuses in Step S809 (Yes in Step S809), the routing control processing unit 105 adds a predetermined flag to the routing control signal and passes the routing control signal including the predetermined flag to the radio communication processing unit 101 for transfer in Step S810. Here, the predetermined flag is information indicating that the subject apparatus has responded to the routing control signal despite the fact that the operation state of the subject apparatus is poorer than the operation state of the routing control apparatus of the previous hop.

At this time, the operation state information included in the routing control signal received in Step S800 may be changed into the operation state information of the subject apparatus and transferred as a new routing control signal. The radio communication processing unit 101 subjects the routing control signal to the processing according to the corresponding wireless communications standards and sends it out to the radio communication channel.

If it is determined that the subject apparatus is the destination routing control apparatus 510 in Step S803 (Yes in Step S803), the routing control processing unit 105 generates in Step S813 a routing control signal indicating that the path has been constructed, and passes it to the radio communication processing unit 101 for responding to the routing control signal received in Step S800, The radio communication processing unit 101 subjects the routing control signal to the processing according to the corresponding wireless communications standards and sends it out to the radio communication channel.

Figure 9:
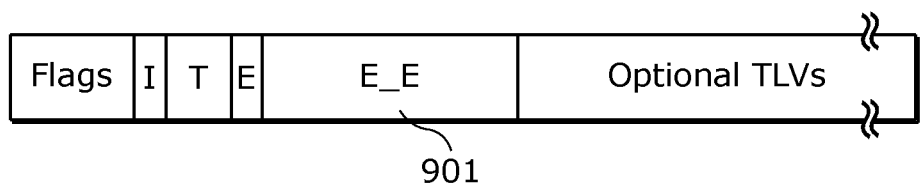
FIG. 9 illustrates a message configuration for advertisement of remaining battery amount information of a previous hop routing control apparatus in an embodiment.
Figure 10:
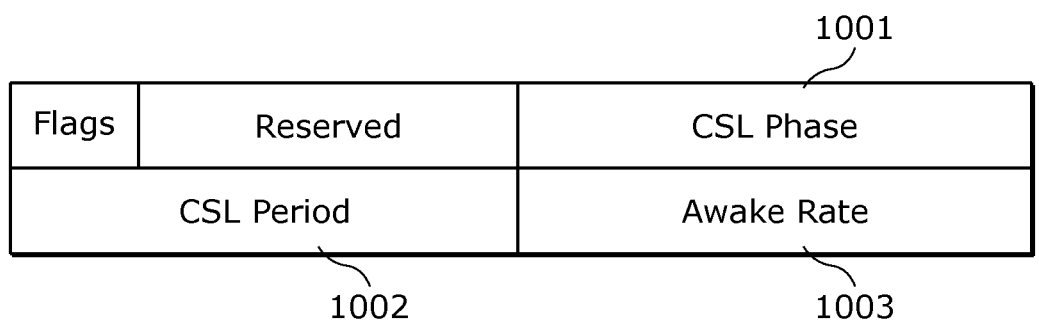
FIG. 10 illustrates a message configuration for advertisement of sleep cycle information of a previous hop routing control apparatus in an embodiment.
Figure 11:
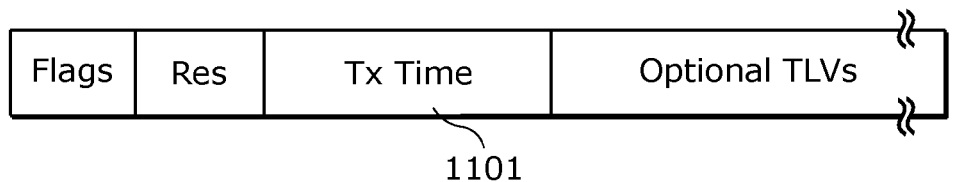
FIG. 11 illustrates a message configuration for advertisement of cumulative transmission time information of a previous hop routing control apparatus in an embodiment.

FIG. 9, FIG. 10 and FIG. 11 illustrate examples of the operation state information included in the routing control signal.

FIG. 9 illustrates an example of a message format including the remaining battery amount information, and is equivalent to the node energy sub-object (NE sub-object) information defined in NPL 3. A field storing remaining battery amount information 901 is defined as E_E field, and the remaining battery amount is expressed as a percentage. Also, the estimated operation time information may be added to an optional field (Optional TLVs).

FIG. 10 illustrates an example of a message format including the sleep cycle information, and includes next start time information 1001, sleep cycle information 1002, and operating rate information 1003. It may also be possible to include only part of the above-listed information. The next start time information 1001 stores information indicating time until the sleep mode transitions to the next awake mode. Also, the next start time information 1001 may store coordinated sampled listening (CSL) phase information in the standard specification of IEEE 802.15.4e. In this case, such information is changed to time-of-day information and recorded in the previous hop state managing unit 103. The sleep cycle information 1002 stores the sleep cycle. Alternatively, the sleep cycle information 1002 may store CSL period information in the standard specification of IEEE 802.15.4e.

FIG. 11 illustrates an example of a message format including cumulative transmission time information 1101. The cumulative transmission time information 1101 stores information indicating time for which a signal is transmitted to the radio communication channel in an immediately previous hour. Based on this information and transmission limit information defined by the system, the maximum transmissible time is calculated and recorded in the previous hop state managing unit 103 together with the cumulative transmission time information 1101.

FIG. 12 illustrates an example of a previous hop operation state in which the various pieces of information included in FIG. 9, FIG. 10, and FIG. 11 are extracted and stored. Together with times of day (Time 1, Time 2) at which the corresponding information is obtained, the individual pieces of information are stored and managed for each of the identifier (IP1) of the routing control apparatus serving as the previous hop and the identifier (IP2) of the subject apparatus, Incidentally, when the subject apparatus serves as the source, the various pieces of information illustrated in FIG. 9, FIG. 10, and FIG. 11 are stored in the routing control information as necessary and transmitted.

With such a processing, it is possible to construct the transmission path via the routing control apparatus having an operation state at least equivalent to the operation state of the previous hop, thereby achieving a more stable path.

Furthermore, with such a processing, it is possible to construct the transmission path via the routing control apparatus having an operation state at least equivalent to the operation state of the previous hop. Thus, if the transmission path is disconnected, the disconnection is likely to occur in communication between the relatively upstream routing control apparatuses. Consequently, the cost of notifying the source can be suppressed compared with the case in which the disconnection occurs in communication between the relatively downstream routing control apparatuses.

Moreover, with such a processing, it becomes also possible to construct a stable path with a reduced amount of delay generated in a mesh network configured by the routing control apparatuses that are operable in a power saving mode.

Additionally, with such a processing, it becomes also possible to construct a stable path with a reduced amount of delay generated in a wireless mesh network configured by the routing control apparatuses that have a limited total transmission time.

In the present embodiment, the routing control message to which whether or not the routing control apparatus is to respond is determined has been described as the routing control signal. The routing control signal may be, for example, any of RREQ and RREP in the AODV routing, and DIO, DIS, and DAO in the RPL routing.

Furthermore, the present embodiment has mentioned that, if the operation state of the subject apparatus is at least equivalent to the operation state of the previous hop, the routing control signal is transferred. The operation state of the previous hop may be divided into several levels (for example, three levels, i.e., good/normal/poor), and the determination may be made based on these levels. In other words, a "good" operation state may be determined to be better than a "normal" operation state, and the "normal" operation state may be determined to be better than a "poor" operation state.

It should be noted that an evaluation value indicating the operation state by a numerical value (for example, an operation degree) may be introduced. For example, the operation degree indicating the operation state by 10 levels of numerical values may be used to associate the above-noted "good" with the operation degree 10, the "normal" with the operation degree 5, and the "poor" with the operation degree 1, respectively. This makes it possible to evaluate the operation state by comparing the numerical values, thereby enhancing the convenience.

Also, the present embodiment has mentioned that, if the operation state of the subject apparatus is at least equivalent to the operation state of the previous hop, the routing control signal is transferred. It may also be possible to set a tolerable range of a transfer condition of the routing control signal. For example, a deterioration degree up to 10% with respect to the operation state of the previous hop is set to be tolerable. Additionally, such a tolerable range may be applied only at the time of timeout in the determination in Step S809. Furthermore, such a tolerable range may be expanded, for example, at the time of timeout in the determination in Step S809, Moreover, the present embodiment has disclosed the method in the case of searching for a forward path from the source to the destination. However, if a backward path is to be searched for that is also possible by reversing the determination condition such that "at least equivalent" is changed to "lower than."

Additionally, the present embodiment has indicated the technique of determining whether to transfer the control packet heading downstream along the transmission path such as RREQ in the AODV routing based on the operation states of the subject apparatus and the previous hop apparatus. However, similar effects can be produced by determining whether to return RREP, which is a response to the RREQ, based on the operation states mentioned above.

As described above, with the routing control apparatus according to the present embodiment, a routing control apparatus having an operation state at least equivalent to an operation state of a routing control apparatus serving as the previous hop apparatus is selected as a part of the transmission path. If the transmission path is disconnected, the disconnection is likely to occur at routing control apparatuses closer to the source. This makes it possible to suppress the cost of transferring a control signal for notification of the path loss. Also, with the configuration described above, a routing control apparatus having an operation state at least equivalent to an operation state of the previous hop apparatus is selected as a part of the transmission path. Accordingly, data that has been successfully transferred to the next hop can be transferred in a more stable path, thus constructing a more stable path. Then, it is possible to construct a transmission path while selecting an apparatus having a good operation state downstream along the transmission path. Consequently, the routing control apparatus can construct a stable transmission path with a reduced control communication amount.

Incidentally, although the present embodiment has been discussed on the assumption that the routing control apparatus adopts IEEE 802.15.4, IEEE 802.15.4g, or IEEE 802.15.4e, there is no particular limitation to this as long as the routing control apparatus relays data. The routing control apparatus according to the present embodiment is also applicable to wireless systems such as wireless LAN, Bluetooth (registered trademark), Zigbee (registered trademark), ZigBeeIP, WiMAX, and a specified low-power radio station.

It should be noted that the radio communication processing unit 101, the previous hop state extracting unit 102, the previous hop state managing unit 103, the operation state comparing unit 104, the routing control processing unit 105, the operation state managing unit 106, the remaining battery amount managing unit 107, the sleep cycle managing unit 108, the cumulative transmission time managing unit 109, and the operation state extracting unit 110 are typically realized as an LSI, which is an integrated circuit. They may be individually made into a single chip or may be partially or entirely made into a single chip, Although the LSI is mentioned above, it may be also referred to as an IC, a system LSI, a super LSI or an ultra LSI depending on the degree of integration.

Furthermore, ways to achieve circuit integration are not limited to the LSI, and a dedicated circuit or a general purpose processor can also achieve the integration. It may be possible to utilize an field programmable gate array (FPGA) that can be programmed after manufacturing LSIs or a reconfigurable processor that allows reconfiguration of the connection and settings of circuit cells inside the LSI.

In the future, with the advancement of a semiconductor technology or another technology deriving therefrom, a new circuit integration technology may replace the LSI. Such a technology may of course integrate the functional blocks. Application of biotechnology is one such possibility.

It should be noted that, in each of the embodiments described above, each structural component may be constituted by dedicated hardware or be realized by executing a software program suitable for each structural component. Each structural component may be realized by a program execution unit such as a CPU or a processor reading out and executing a software program stored in a hard disk or a recording medium such as a semiconductor memory. Here, the software realizing the routing control apparatus, etc., of the above-described embodiment may be a program as follows.

In other words, such a program causes a computer to execute a routing control method performed in a routing control apparatus that constructs a transmission path for transmitting communication data from a source apparatus to a destination apparatus in a wireless mesh network, the routing control method including: receiving a first control signal for constructing a portion of the transmission path, and managing first information indicating operability, which is availability of a previous hop apparatus in a future, the portion being from the source apparatus to the routing control apparatus, and the previous hop apparatus being a source of the first control signal that has been received; managing second information indicating operability of the routing control apparatus; and comparing the first information and the second information, and, if the operability of the routing control apparatus is higher than or equal to the operability of the previous hop apparatus, transmitting a second control signal for constructing a remaining portion of the transmission path other than the portion.

INDUSTRIAL APPLICABILITY

The routing control apparatus according to the present invention has a function of determining whether to respond to a routing control signal based on the result of comparison between the operation state information of a routing control apparatus of a previous hop and the operation state information of the subject apparatus. The routing control apparatus according to the present invention is applicable to a wireless communication module for home energy management system (HEMS), building energy management system (BEMS), factory energy management system (FENS), or cluster community energy management system (CEMS), a wireless LAN card, a wireless LAN module, a tablet terminal, a portable navigation terminal, a personal computer, a home appliance compatible with network, an electronic book terminal, or the like.

REFERENCE SIGNS LIST 1, 502, 503, 504, 505, 506, 507, 508, 509 Routing control apparatus
101 Radio communication processing unit
102 Previous hop state extracting unit
103 Previous hop state managing unit
104 Operation state comparing unit
105 Routing control processing unit
106 Operation state managing unit
107 Remaining battery amount managing unit
108 Sleep cycle managing unit
109 Cumulative transmission time managing unit
110 Operation state extracting unit
201 CPU
202 ROM
203 RAM
204 Storage device
205 WNIC
500 Wireless mesh network
501 Routing control apparatus (source routing control apparatus)
510 Routing control apparatus (destination routing control apparatus)
511 Radio communication channel
601 Routing control signal
701 Communication path
901 Remaining battery amount information on
1001 Next start time information
1002 Sleep cycle information
1003 Operating rate information
1101 Cumulative transmission time information

The invention claimed is:

1. A routing control apparatus that constructs a transmission path for transmitting communication data from a source apparatus to a destination apparatus in a wireless mesh network, the routing control apparatus comprising:
    a previous hop managing unit configured to receive a first control signal for constructing a portion of the transmission path from the source apparatus to the routing control apparatus and including first information, and manage the first information included in the first control signal that has been received, the first information indicating operability, which is availability of a previous hop apparatus in a future, and the previous hop apparatus being a source of the first control signal that has been received;
    an operation managing unit configured to manage second information indicating operability of the routing control apparatus; and
    a routing control unit configured to compare the first information and the second information, and, if the operability of the routing control apparatus is higher than or equal to the operability of the previous hop apparatus indicated by the first information under management of the previous hop managing unit, transmit a second control signal for constructing a remaining portion of the transmission path other than the portion,
    wherein each of the previous hop apparatus and the routing control apparatus transitions between a sleep mode and a normal mode in every sleep cycle,
    the first information includes a first sleep cycle of the previous hop apparatus, the operability of the previous hop apparatus rising with an increase in the first sleep cycle,
    the operation managing unit is configured to manage the second information including a second sleep cycle of the routing control apparatus, the operability of the routing control apparatus rising with an increase in the second sleep cycle,
    the first information includes a first operating rate of the previous hop apparatus, the first operating rate being calculated based on the first sleep cycle, and the operability of the previous hop apparatus rising with an increase in the first operating rate, and
    the operation managing unit is configured to manage the second information including a second operating rate of the routing control apparatus, the second operating rate being calculated based on the second sleep cycle, and the operability of the routing control apparatus rising with an increase in the second operating rate.

2. The routing control apparatus according to claim 1,
    wherein the routing control unit is configured to make a transmission of the second control signal if the routing control apparatus does not receive a third control signal for construction of another portion of the transmission path by an apparatus that is included in the wireless mesh network and has received the first control signal until a predetermined period elapses after the previous hop managing unit receives the first control signal even when the operability of the routing control apparatus is lower than the operability of the previous hop apparatus, the another portion being from the apparatus to the destination apparatus.

3. The routing control apparatus according to claim 1, wherein each of the previous hop apparatus and the routing control apparatus is operated by power supplied from a battery, the first information includes a first remaining battery amount of the previous hop apparatus, the operability of the previous hop apparatus rising with an increase in the first remaining battery amount, and the operation managing unit is configured to manage the second information including a second remaining battery amount of the routing control apparatus, the operability of the routing control apparatus rising with an increase in the second remaining battery amount.

4. The routing control apparatus according to claim 3, wherein the first information includes first operable time calculated based on the first remaining battery amount, the first operable time being a period for which the previous hop apparatus is operable in the future, and the operability of the previous hop apparatus rising with an increase in the first operable time, and the operation managing unit is configured to manage the second information including second operable time calculated based on the second remaining battery amount, the second operable time being a period for which the routing control apparatus is operable in the future, and the operability of the routing control apparatus rising with an increase in the second operable time.

5. The routing control apparatus according to claim 1, wherein the first information includes first cumulative transmission time, which is a cumulative value of past data communication time of the previous hop apparatus per unit time, the operability of the previous hop apparatus lowering with an increase in the first cumulative transmission time, and the operation managing unit is configured to manage the second information including second cumulative transmission time, which is a cumulative value of past data communication time of the routing control apparatus per unit time, the operability of the routing control apparatus lowering with an increase in the second cumulative transmission time.

6. The routing control apparatus according to claim 1, wherein each of the previous hop apparatus and the routing control apparatus has an upper limit of data transmission time per unit time, the upper limit being set in advance, the first information includes first transmissible time, which is an upper limit of future data transmission time of the previous hop apparatus per unit time, the operability of the previous hop apparatus rising with an increase in the first transmissible time, and the operation managing unit is configured to manage the second information including second transmissible time, which is an upper limit of future data transmission time of the routing control apparatus per unit time, the operability of the routing control apparatus rising with an increase in the second transmissible time.

7. The routing control apparatus according to claim 1, wherein the first information includes a plurality of kinds of information indicating the operability of the previous hop apparatus, the second information includes a plurality of kinds of information that indicates the operability of the routing control apparatus and is of a same kind with the information included in the first information, the previous hop managing unit is configured to calculate the operability of the previous hop apparatus based on one specific kind of information among the plurality of kinds of information included in the first information, the operation managing unit is configured to calculate the operability of the previous hop apparatus based on the one specific kind of information among the plurality of kinds of information included in the second information, and the routing control unit further comprises a switching unit configured to switch a kind of information used in calculation by the previous hop managing unit and the operation managing unit from the one specific kind to another kind if the routing control apparatus does not receive a control signal transmitted by an apparatus that is included in the wireless mesh network and has received the first control signal until a predetermined period elapses after the previous hop managing unit receives the first control signal even when the operability of the routing control apparatus is lower than the operability of the previous hop apparatus.

8. The routing control apparatus according to claim 1, wherein the first information includes a plurality of kinds of information indicating the operability of the previous hop apparatus, the second information includes a plurality of kinds of information that indicates the operability of the routing control apparatus and is of a same kind with the information included in the first information, the previous hop managing unit is configured to calculate the operability of the previous hop apparatus based on a combination of two or more specific kinds of information among the plurality of kinds of information included in the first information, the operation managing unit is configured to calculate the operability of the previous hop apparatus based on the combination of two or more specific kinds of information among the plurality of kinds of information included in the second information, and the routing control unit further comprises a switching unit configured to switch a combination of two or more kinds of information used in calculation by the previous hop managing unit and the operation managing unit from the combination of two or more specific kinds of information to another combination thereof if the routing control apparatus does not receive a control signal transmitted by an apparatus that is included in the wireless mesh network and has received the first control signal until a predetermined period elapses after the previous hop managing unit receives the first control signal even when the operability of the routing control apparatus is lower than the operability of the previous hop apparatus.

9. A routing control method performed in a routing control apparatus that constructs a transmission path for transmitting communication data from a source apparatus to a destination apparatus in a wireless mesh network, the routing control method comprising:

receiving a first control signal for constructing a portion of the transmission path from the source apparatus to the routing control apparatus and including first information, and managing the first information included in the first control signal that has been received, the first information indicating operability, which is availability of a previous hop apparatus in a future, and the previous hop apparatus being a source of the first control signal that has been received;

managing second information indicating operability of the routing control apparatus; and comparing the first information and the second information, and, if the operability of the routing control apparatus is higher than or equal to the operability of the previous hop apparatus indicated by the first information, transmitting a second control signal for constructing a remaining portion of the transmission path other than the portion, wherein each of the previous hop apparatus and the routing control apparatus transitions between a sleep mode and a normal mode in every sleep cycle, the first information includes a first sleep cycle of the previous hop apparatus, the operability of the previous hop apparatus rising with an increase in the first sleep cycle, the second information includes a second sleep cycle of the routing control apparatus, the operability of the routing control apparatus rising with an increase in the second sleep cycle, the first information includes a first operating rate of the previous hop apparatus, the first operating rate being calculated based on the first sleep cycle, and the operability of the previous hop apparatus rising with an increase in the first operating rate, and the second information includes a second operating rate of the routing control apparatus, the second operating rate being calculated based on the second sleep cycle, and the operability of the routing control apparatus rising with an increase in the second operating rate.

10. A non-transitory computer-readable recording medium having a program recorded thereon for causing a computer to execute the routing control method according to claim 9.

* * * * *